United States Patent [19]
Ban et al.

[11] 4,118,743
[45] Oct. 3, 1978

[54] CASSETTE TAPE RECORDER WITH MEMORY CONTROLLED SELECTIVE BY-PASS

[76] Inventors: Itsuki Ban, 829, Higashioizumimachi, Nerima-ku, Tokyo; Shohei Iizuka, 363-4, Imajukunishimachi, Asahi-ku, Yokohama-shi, Kanagawa-ken; Hisashi Funakoshi, 1-10-4, Nakamachi, Meguro-ku, Tokyo, all of Japan

[21] Appl. No.: 801,257

[22] Filed: May 27, 1977

[30] Foreign Application Priority Data

May 31, 1976 [JP] Japan .................................. 51-62372

[51] Int. Cl.$^2$ ...................... G11B 15/44; G11B 15/18
[52] U.S. Cl. ........................................ 360/73; 360/72
[58] Field of Search .................... 360/74, 73, 96, 105, 360/75, 72; 179/100.1 VC; 226/10

[56] References Cited

U.S. PATENT DOCUMENTS 3,624,308  11/1971  Kozu et al. .............................. 360/73
3,665,117  5/1972  Staar ........................... 179/100.1 VC Primary Examiner—Robert S. Tupper
Attorney, Agent, or Firm—Lane, Aitken, Dunner & Ziems

[57] ABSTRACT

A cassette-type magnetic tape recorder/player has a movable plate mounted on its deck for reciprocating movement between reproduction and non-reproduction positions. At least a second slide member is also mounted on the deck and likewise biased toward the reproduction position. The movable plate carries a magnetic head and a pivotally mounted pinch roller which engages a rotatably driven capstan mounted on the deck. The second slide member can be manually moved to a second position where it engages and moves a magnetic actuator which, in turn, serves to pivot the pinch roller out of contact with the capstan. The magnetic actuator is surrounded by an electromagnetic coil which serves, when activated, to hold the magnetic actuator in the position where it disengages the pinch roller. The coil is activated responsive to the detection of blank zones on the magnetic tape.

7 Claims, 6 Drawing Figures

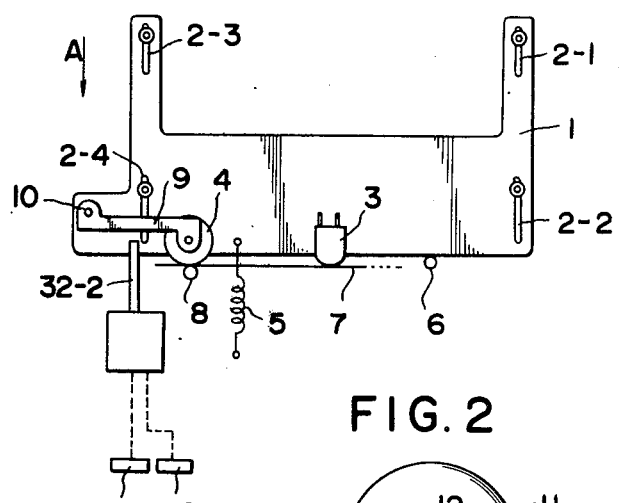
FIG. 1
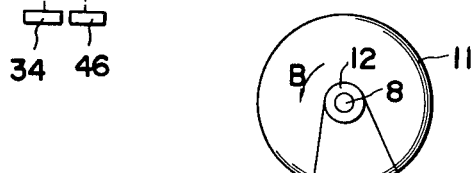
FIG. 2
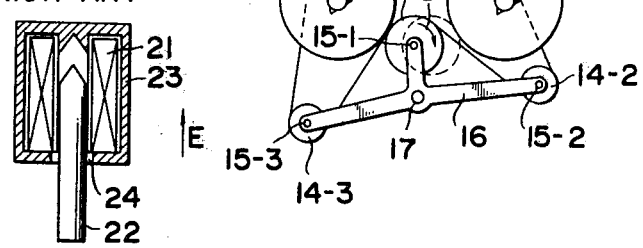
FIG. 3 "PRIOR ART"

CASSETTE TAPE RECORDER WITH MEMORY CONTROLLED SELECTIVE BY-PASS

BACKGROUND OF THE INVENTION

This invention relates to an improved cassette magnetic tape recording/reproducing apparatus.

The prior art discloses magnetic tape cassette recorder/players of a type adapted for selecting a single recording from among many recorded on a single magnetic tape. In the conventional apparatus, a movable plate, which carries a magnetic head, is moved backward against the strong elastic force of a spring by an electromagnetically operated plunger. However, operation of the plunger requires a relatively large amount of electricity and creates mechanical noise. Further, the conventional plunger mechanism is complicated in construction and costly.

SUMMARY OF THE INVENTION

The above-mentioned drawbacks in the conventional apparatus have been eliminated by the present invention. The invention provides a magnetic tape recorder/player with an improved electromagnetic device which moves for releasing the pinch roller in a reproduction mode.

Accordingly, a first object of the invention is to provide a magnetic recorder/reproducing apparatus with an electromagnetic device which does not require a large amount of electric power for selecting, by fast-feed or rewind of a magnetic tape, any desired recording from among many on the tape.

A second object of the invention is to provide a magnetic recording/reproducing apparatus which operates to select a recording with reduced mechanical noise.

A third object of the invention is to provide a magnetic recording/reproducing apparatus wherein the above-mentioned electromagnetic device is utilized to hold the pinch roller in a position disengaged from the capstan.

A fourth object of the invention is to provide a magnetic recording/reproducing apparatus provided with a mechanism for changing the direction of rotation of a motor for driving the capstan and the direction of rotation of the reel-stands, and, at the same time, to drive the reel-stands at a higher speed of rotation than the capstan drive motor.

A fifth object of the invention is to provide a magnetic recording/reproducing apparatus having electric circuitry for fast by-pass of a preselected number of recordings.

The above and other objects and advantages of the invention will be apparent from the description which is given in the following with reference to the drawings.

BRIEF DESCRIPTION OF THE DRAWINGS

FIG. 1 is a plan view illustrating a movable plate and associated mechanism mounted on the deck of the apparatus of the invention.

FIG. 2 is a plan view illustrating a drive mechanism for the reel-stands used in the apparatus of the invention.

FIG. 3 is a longitudinal cross-section view of a prior art electromagnetic device for positioning the pinch roller.

DESCRIPTION OF THE PREFERRED EMBODIMENT

Figure 4:
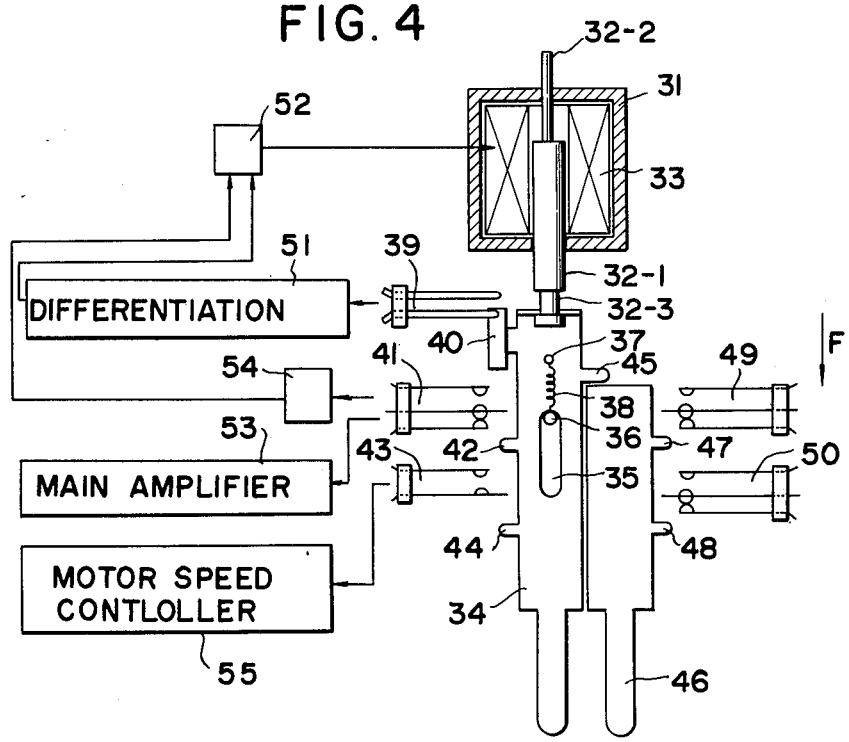
FIG. 4 is a plan view, partially in cross-section, of an electromagnetic device and associated mechanical and electrical circuitry of the present invention, illustrating operation of a fast-feed mode.

Referring now to FIG. 1, numeral 1 indicates a movable plate which is supported in a manner such that the plate can slide forward and backward along guide slots 2-1, 2-2, 2-3, 2-4 formed therein through which guide pins 70 mounted on a deck (not shown) protrude. The movable plate 1 carries a magnetic head 3 and a pinch roller 4, and is elastically biased in the direction of arrow A by the relatively large elastic force of a spring 5. The movable plate 1, which moves in the direction of arrow A by operation of the elastic force of the spring 5, is restrained from further movement by an abutting pin 6 mounted on the deck. This illustrated position is a reproduction position where a magnetic tape 7 contained in a cassette (not shown) is in sliding contact with the magnetic head 3. The tape 7 is held in position between a capstan 8 and the pinch roller 4, and is driven at a speed equal to the peripheral speed of the capstan 8. The pinch roller 4 is moved forward and backward with the sliding movement of the movable plate 1, while the pinch roller 4 can swing on a lever 9 above a shaft 10 mounted on the movable plate 1 and is elastically biased toward the capstan 8 by a spring (not shown). The movable plate 1 can be moved backward from the illustrated position to a non-reproduction position as in the stop, fast-feed (without music selection) and rewind modes. Since the object of the invention is the fast by-pass to a pre-selected recording, description the three above-mentioned modes is omitted here in the interest of brevity.

For automatic selection of music, fast drive in both directions is required, i.e. fast drive of tape 7 in the direction of reproduction (forward direction) and fast drive in the direction opposite to that of reproduction (reverse direction). A mechanism capable of selectively effecting either forward or reverse fast drive will now be described with reference to FIG. 2. The capstan 8 is fixed to a fly-wheel 11 for rotation therewith. Both are driven together by means of a motor through pulley 12 and drive belt 13. The pulley 12 is operatively connected to the capstan 8 through a conventional slip mechanism or clutch having a felt sheet, and thus the pulley 12 will slip relative to the capstan 8 when the tension in drive belt 13 exceeds a predetermined value. The drive belt 13 is wound around wheels 14-2, 14-1, 14-3, and a pulley 12, as shown in FIG. 2. The wheels 14-1, 14-2, 14-3 are mounted for rotation respectively about shafts 15-1, 15-2, 15-3 which, in turn, are mounted on a lever or pivoting arm member 16 which is pivotally supported on a shaft 17 mounted on the deck. When the capstan 8 rotates in the direction of arrow B, the belt 13 is driven in the direction of arrow C to apply a rotational torgue to the lever 16, and thus the wheel 14-1 is brought into light contact with a reel-stand 18-1. Since the wheel 14-1 rotates in the direction of arrow D, the wheel 14-1 contacts the reel-stand 18-1 in a wedging angle relationship, thus providing firm contact between the wheel 14-1 and the reel-stand 18-1. The reel-stand 18-1 receives a rotating force from wheel 14-1 which is in an equilibrium relationship with respect to driving tension in the tape 7. When the tape 7 is under constraint by the pinch roller 4 and the capstan 8, tension in the tape 7 will be increased, and accordingly slip between the capstan 8 and the pulley 12, which is driven by the belt 13, will be increased, and the rotating speed of the reel-stand 18-1 will be decreased. On the other hand, when the tape 7 is released from the pinching action of the pinch roller 4 and capstan 8, tension in the tape will be reduced, slip between the capstan 8 and the pulley 12 will be decreased, and the rotating speed of the reel-stand 18-1 will be increased. Upon reverse rotation of the motor, the pulley 12 rotates in the reverse direction, and the drive belt 13 is driven in the direction opposite to arrow C. Accordingly, the lever 16 is given a clockwise rotational torque, and thus the wheel 14-1 moves into contact with a reel-stand 18-2. In this position, the wheel 14-1 rotates counterclockwise (reverse to arrow D), and accordingly the wheel 14-1 contacts the reel-stand 18-2 in a wedging angle relationship to transmit driving force to the reel-stand 18-2. As will be understood from the above, by changing rotational direction of the motor, tape-drive direction can be changed. In the fast-feed mode, the rotational speed of the reel-stands will be high, because the tension in the tape 7 decreases as the rotational speed of the motor increases, and thus slip between the capstan 8 and the pulley 12 is reduced.

The construction of an electromagnetic device which is employed in the invention will now be described. In order to locate, by means of fast-drive of the magnetic tape, the starting point of a preselected tune or other recording, among other tunes recorded on the tape, thereby enabling play of the selected tune from its beginning, it is necessary that the magnetic head 3 be maintained in contact with the tape 7 while the pinch roller 4 is released from engagement with the capstan 8. In the conventional prior art recorder/player an electromagnetically actuated plunger is employed to release or force the roller 4 away from and out of engagement with the capstan 8. However, this prior art plunger device is considered to be excessively large and its operation consumes a large amount of electric power. This problem is solved by the present invention which provides an electro-magnetic device which does not include a plunger. The construction of a prior art electromagnet is shown in FIG. 3. When an exciting coil 21 is supplied with current, an armature 22 is moved in the direction of arrow E to establish a magnetic circuit through the armature 22 and a yoke 23. The yoke 23 is provided with an air-gap 24 or a material of magnetic resistance, such as plastic, to prevent frictional contact with the armature 22. If the armature 22 is in contact with the yoke, upon current supply to the exciting coil 21, the armature 22 will be brought into strong frictional contact with the yoke 23 by the magnetic force and, accordingly, the armature 22 will be prevented from moving in the direction of arrow E.

In the electromagnetic device used in the invention, an actuator of magnetic material, which corresponds to the conventional armature, is pushed forward by hand and, upon completion of movement of the actuator, the exciting coil is supplied with current, thus establishing the magnetic circuit.

An electromagnetic device of the present invention will now be described with reference to FIG. 4. A yoke 31 is, unlike the prior art structure, constructed so that it is in sliding contact with an actuator 32-1 which is made of a magnetic material and which carries a projection 32-2. With this arrangement lateral displacement of the actuator 32-1 is restrained by the yoke 31. A coil 33 is disposed in the yoke 31 in a coaxial and spaced relationship with the magnetic actuator 31-1. This electromagnetic device can be easily assembled by fabricating the box-shaped yoke 31, inserting the coil 33, which has been wound around a bobbin, into the yoke 31 and inserting the magnetic actuator 32-1 into the bobbin of the coil 33. Such an electromagnetic device requires no air-gap between the yoke 31 and the magnetic actuator 32-1 because the device is designed so that the actuator 32-1 is moved by hand. In this device which has virtually no air-gap between the yoke 31 and the actuator 32-1, the force with which the excited coil 33 holds the actuator 32-1 is about twice as large as in the prior art device. In this embodiment, the magnetic actuator 32-1 is provided with a shank portion 32-3 of reduced diameter along which the collar end portion of an actuating slide 34 moves. The actuating slide 34 has a guide slot 35 which is adapted to engage a pin 36 which, in turn, is mounted on the deck, to guide the sliding movement of member 34. The slide 34 is elastically biased in the direction of arrow F by the elastic force of a spring 38 which is fixed at its opposite ends to a pin 37, mounted on slide 34, and to pin 36. The slide 34 carries a contact 40 for opening and closing an electric switch 39, a projection 42 for change-over of an electric switch 41, and a projection 44 for opening and closing an electric switch 43. The switch 39 is closed when the actuating slide 34 has moved from the position shown to the opposite extremity of shank 32-3 where it engages the shoulder of the magnetic actuator 32-1. Switch 39 remains closed as the actuating slide 34 moves further toward the yoke 31, bringing the actuator 32-1 into latching engagement with the bottom of the yoke 31. Switches 41 and 43 remain as shown in FIG. 4 during the time when the magnetic actuator 32-1 is stationary and movement of the actuating slide 34 is within the shank or neck 32-3 of the magnetic actuator 32-1. Change-over and closing of switches 41 and 42 occurs as actuator 32-1 is moved into latching engagement with the bottom of the yoke 31 by further movement of the actuating slide 34. The actuating slide 34 is further provided with a projection 45 which is adapted to be engaged by actuating slide 46, whereby movement of slide 46 toward yoke 31 carries along slide 34. The actuating slide 46 is also provided with projections 47 and 48 which are adapted for change-over of switches 49 and 50, respectively. When the actuating slide 46 moves from the position shown, toward yoke 31, it comes into abutment with and pushes the projection 45 to move actuating slide 34. During the time interval when movement of the actuating 34 is within the range of the shank or annular depression 32-3 of the magnetic actuator, 32-1, i.e. while the actuator in stationary, the switches 49, 50 are not changed over. Operation of these switches by the projections 47 and 48 is effected when the motion of actuating rod 46 has carried to the point where the magnetic actuator 32-1 has been pushed into the yoke 31. The magnetic actuator 32-1, which is held fully inserted into the yoke 31 by means of coil 33, is returned back, by the elastic force of the spring 38, to its original position as shown in FIG. 4 when supply of the exciting current to coil 33 is stopped.

The circuits for operation of the respective electric switches will now be described. When the actuating slide 34 is pushed to the point where its end reaches the extremity of the depression 32-3 in the magnetic actuator, switch 39 is closed. A signal generated by the closing of switch 39 is provided to the input of a differentiation circuit 51, the output of which is connected as one input to electric circuit 52 which is adapted to control the current supplied to the electromagnetic device, the circuit 52 being described in detail below. When fast by-pass of a recording or recordings on the magnetic tape is desired, the close-and-open operation of the switch 39 is repeated as many times as the number of the by-passed recordings, and this number is stored in the circuit 52. The change-over switch 41 switches a signal, which has received through a pre-amplifier from the magnetic head, to either the main amplifier 53 or to circuit 54. Circuit 54 detects zones on the magnetic tape 7 between recordings as described in detail below. The switch 43 is adapted to provide a switch signal to by-pass a motor speed control circuit 55, thereby enabling the motor to run in a high speed mode. The switches 49 and 50 are adapted to effect switching between forward and reverse rotation of the motor which drives the capstan.

When fast by-pass of these recordings by forward fast-feed of the tape is desired, for example, the actuating slide 34 is lightly pushed by the manual operator repeatedly to close-and-open the switch 39 three times. The actuating slide 34 is then pushed strongly so that the top end of the projection 32-2 of the magnetic actuator will push the lever 9 (FIG. 1), and thereby swing the pinch roller 4 away from the capstan 8. At the same time, the switch 43 is closed, the motor for the capstan driver runs in a high speed mode, and the reel-stand 18-1 rotates at a speed as high as about 5 to 10 times the normal speed by means of the mechanism described in connection with FIG. 2. The switch 41 switches audio signals, which are received through a pre-amplifier from the magnetic head, to the input to the detecting circuit 54 for detection of non-signal bands or zones provided between recordings on the magnetic tape. The output of circuit 54 is provided as a second input to circuit 52. The coil 33 is also supplied with current through the circuit 52, and the magnetic actuator 32-1 is fully inserted into the yoke 31. When a non-signal zone on the tape is detected by circuit 54, current supply to the coil 33 is cut off through the circuit 52, the actuating rod 34 returns to the position shown in FIG. 4 by the elastic force of the spring 38, thereby releasing lever 9 and allowing the pinch roller 4 to swing into pressing engagement with the capstan 8. In the device of the invention, since the movement of the actuating slide 34 is not accompanied by movement of the plate, i.e. plate 1 in FIG. 1, there will be no significant mechanical noise. Upon return of actuating slide 34 to the position in FIG. 4, switch 43 is engaged and the motor drive for the capstan resumes the normal speed rotation, by means of the switch 43, and 41 switches audio signals from the pre-amplifier to the main amplifier 53 thereby enabling play the selected recording.

When fast-drive of the magnetic tape in the reverse direction is desired, the actuating slide 46 is manually pushed, thereby engaging projection 45 and moving the actuating slide 34, thus producing the same operations as described above in connection with forward fast-feed. Upon strongly pushing the actuating slide 46, change-over of the switches 49 and 50 is effected, and thus the motor for the capstan drive rotates in the reverse direction. With the reverse rotation of the motor, the reel-stand 18-2 is rotated, by means of the mechanism of FIG. 2, at a high speed to take up the tape 7. When the reverse fast by-pass of a predetermined number of recordings is completed, the actuating slide 34 is returned to the position shown in FIG. 4 by means of the spring 38 as described above. At the same time, the actuating slide 46 returns back to the position shown in FIG. 4, and rotation of the motor for the capstan drive is changed from reverse rotation to forward rotation at normal speed.

Figure 5:
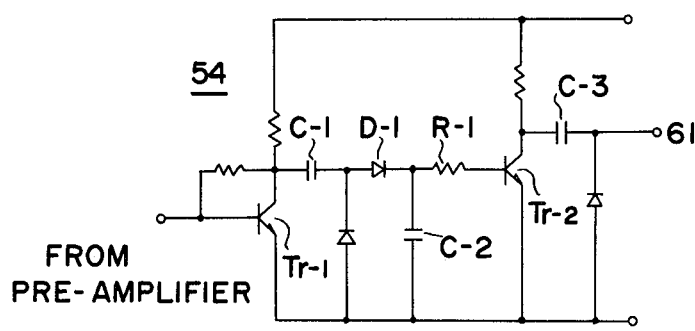
FIG. 5 is a diagram of a tape blank zone detecting circuit used in the apparatus of the present invention.

The non-signal zone detecting circuit 54 will now be described with reference to FIG. 5. Preamplified audio signals from the magnetic head and switchably connected to circuit 54 through switch 41 are further amplified by an audio signal amplifying transistor $Tr\text{-}1$. The amplifier audio signal provided by the transistor $Tr\text{-}1$ is coupled through a capacitor $C\text{-}1$ to a diode $D\text{-}1$ which rectifies the coupled audio signal. Diode $D\text{-}1$ is connected to a capacitor $C\text{-}2$ and the rectified signal from the diode $D\text{-}1$ charges the capacitor $C\text{-}2$. The capacitor $C\text{-}2$ is connected to a transistor $Tr\text{-}2$ through a resistance $R\text{-}1$ and thereby controls the switching state of the transistor $Tr\text{-}2$ based upon the voltage across the capacitor $C\text{-}2$ which in turn depends upon the charge stored in the capacitor $C\text{-}2$. Accordingly, when the apparatus is operated for fast-drive of the tape for automatic music selection and when sound signals are being supplied from the pre-amplifier, the transistor $Tr\text{-}2$ is maintained in the ON state. On the other hand, when a non-signal zone is encountered on the tape, the transistor $Tr\text{-}2$ is turned off after an elapse of time corresponding a time constant determined by the capacitor $C\text{-}2$ and the resistance $R\text{-}1$. The ON/OFF signals thus provided by the transistor $Tr\text{-}2$ are coupled through a capacitor $C\text{-}3$ to an output terminal 61 which is connected to an input to the circuit 52 for controlling the electromagnetic device as shown in FIGS. 4 and 5.

Figure 6:
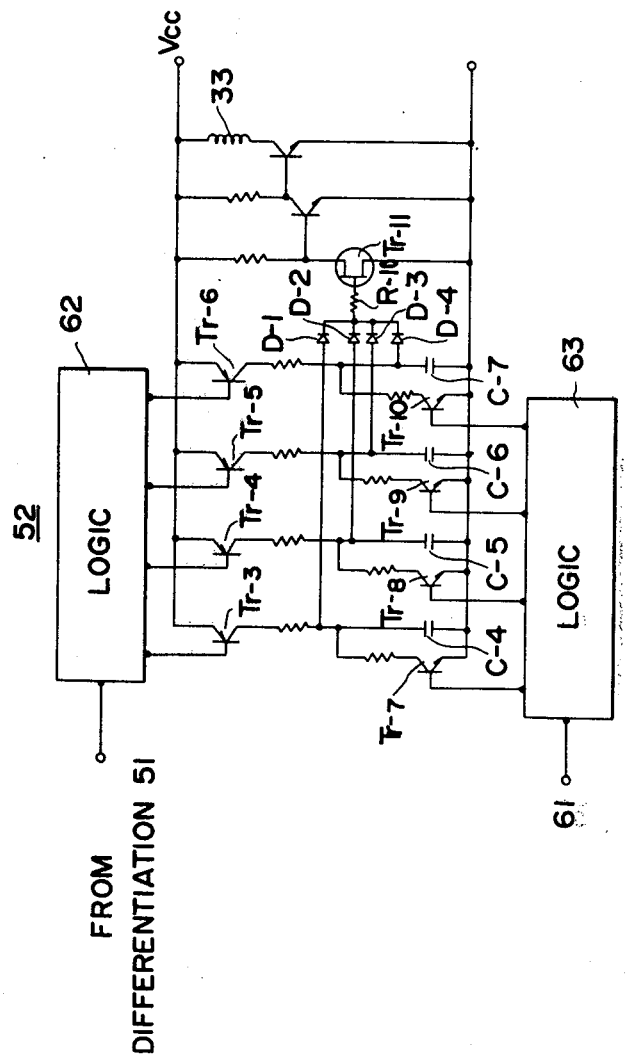
FIG. 6 is a diagram of a circuit for operation of the electromagnetic device of the present invention.

The electric circuit 52 will now be described with reference to FIGS. 4 and 6. The switch signal provided by the switch 39 is applied as an input to the differentiation circuit 51, the output of which is connected to an input of circuit 52, and more specifically to logical circuit 62 of circuit 52. Depending on the various signals from circuit 62 provided to the bases of transistors $Tr\text{-}3$, $Tr\text{-}4$, $Tr\text{-}5$, $Tr\text{-}6$, one or more of those transistors may be made and maintained in a conductive state for a predetermined period of time. Conduction of the transistors $Tr\text{-}3$, $Tr\text{-}4$, $Tr\text{-}5$, $Tr\text{-}6$ results in charging of the corresponding capacitors $C\text{-}4$, $C\text{-}5$, $C\text{-}6$, $C\text{-}7$ which, in turn, control the switching state of a switching element $Tr\text{-}11$ through diodes $D\text{-}2$, $D\text{-}3$, $D\text{-}4$, $D\text{-}5$ and a high impedence element $R\text{-}10$ as shown in FIG. 6. By appropriate selection of the element $R\text{-}10$, the switching element $Tr\text{-}11$ and the capacitors $C\text{-}4$ to $C\text{-}7$, the time constant for the switching of switching element $Tr\text{-}11$ may be controlled and made sufficiently large. When a signal from the non-signal zone detecting circuit 54 indicating detection of a non-signal zone is applied through the terminal 61 (FIG. 5), to another input to circuit 52, and more specifically to a logical circuit 63 of circuit 52, transistors $Tr\text{-}7$, $Tr\text{-}8$, $Tr\text{-}9$, $Tr\text{-}10$ are activated, and the capacitors $C\text{-}4$ to $C\text{-}7$ are caused to rapidly discharge. Thus, if the apparatus is initially adjusted (i.e. programmed or commanded) to provide a fast run-over of three signal or music zones on the tape, for example, the transistors $Tr\text{-}3$ to $Tr\text{-}5$ will be turned on, the capacitors $C\text{-}4$ to $C\text{-}6$ will be charged, the switching element $Tr\text{-}11$ will be turned on, and the coil 33 (FIGS. 4 and 6) will be supplied with and excited by current from the power source $V_{cc}$. Upon completion of the fast run-over of the first signal or music zone on the tape, the transistor $Tr$-7 will be activated, thereby causing the capacitor C-4 to discharge. However, the capacitors C-5, C-6 will be maintained in a charged state, thereby holding switching element $Tr$-11 in the ON state so that current continues to be supplied to the coil 33. Upon completion of the fast run-over of the first three signal or musics zones on the tapes, the capacitors C-4 to C-6 are all discharged, the switching element $Tr$-11 is switched to the OFF state, and the supply of current to the coil 33 is cut off. In this manner the apparatus can be caused to perform a fast run-over of any desired preselected number of music zones on the tape.

While the invention has been described in connection with the preferred embodiment, it is to be understood that various changes and modifications can be made without departing from the spirit and scope of the invention as defined by the appended claims.

We claim:

1. In a magnetic recording/reproducing apparatus for cassette magnetic-tapes, which apparatus has a non-reproduction mode including a fast forward operation and a rewind operation, comprising a movable plate mounted on a deck for reciprocating movement between reproduction and non-reproduction positions, the plate being spring biased toward the reproduction position, a magnetic head mounted on the movable plate at a position where the magnetic head, when the movable plate is at the reproduction position, is in sliding contact with a magnetic tape, a pinch roller movably connected to the movable plate by a pinch roller mounting means, the pinch roller movable between a reproduction position in which the pinch roller is in contact with a capstan and a remote non-reproduction position in which the pinch roller is out of contact with the capstan, the pinch roller being spring biased to the reproduction position, tape drive means for driving the tape at a play speed with the pinch roller in its reproduction position and a fast speed with the pinch roller in the remote non-reproduction position, means supplying electric current to the tape drive means, the improvement comprising:

manually actuatable slides for selecting respectively, the fast forward and the rewind operation, said slides mounted on the deck for reciprocating movement between reproduction and non-reproduction mode positions, said slides resiliently biased toward the reproduction mode position and manually actuatable to the non-reproduction mode position;

first switch means opened and closed by each manual actuation of each of said slides to a position intermediate the slide reproduction and non-reproduction mode positions;

a magnetic actuator engaged by said slide for reciprocating movement with said slides, said magnetic actuator positioned with respect to the pinch roller to push the pinch roller away from the capstan when either one of said slides has been actuated to its non-reproduction mode position;

an electromagnetic coil surrounding said magnetic actuator for holding said magnetic actuator in its nonreproduction position by electromagnetic force when supplied with an electric current;

circuit means including a memory circuit for storing electrical signals corresponding to the number of opening and closings of said first switch means and an excitation circuit for supplying said electric current to said coil when one or more of said electrical signals are stored in said memory circuit;

detection circuit means connected to said magnetic head for detecting blank zones on the magnetic tape; and means for erasing one of said stored signals for each detected blank zone on the magnetic tape and causing said excitation circuit to remove said holding electric current from said coil when all of said stored signals are erased from said memory circuit thereby permitting said actuator and said slide to return to the reproduction position.

2. The apparatus of claim 1, wherein said electromagnetic coil is housed in a yoke.

3. The apparatus of claim 1, wherein said magnetic-material actuator is inserted through said yoke with substantially no diametrical clearance therebetween.

4. The apparatus of claim 1, wherein said engagement between said actuating slide and said magnetic actuator is by a lost motion connection.

5. The apparatus of claim 1, wherein said slide reciprocates on an axis substantially parallel to the axis of reciprocation of said movable plate.

6. The apparatus of claim 1, wherein said memory circuit includes a plurality of memory elements each having a nonstorage state and a storage state.

7. The apparatus of claim 1, wherein said detection circuit means includes a time constant circuit for detecting blank zones of a selected duration.

* * * * *